(12) United States Patent
Beck

(10) Patent No.: US 6,923,300 B2
(45) Date of Patent: Aug. 2, 2005

(54) DRIVESHAFT BRAKE ASSEMBLY

(76) Inventor: Roy Beck, 1593 Ladd Springs Rd., Cleveland, TN (US) 37323

( * ) Notice: Subject to any disclaimer, the term of this patent is extended or adjusted under 35 U.S.C. 154(b) by 0 days.

(21) Appl. No.: 10/619,590

(22) Filed: Jul. 16, 2003

(65) Prior Publication Data

US 2004/0159504 A1 Aug. 19, 2004

Related U.S. Application Data

(60) Provisional application No. 60/396,002, filed on Jul. 16, 2002.

(51) Int. Cl.[7] .............................................. F16D 57/06
(52) U.S. Cl. ....................................... 188/295; 188/294
(58) Field of Search ....................... 123/192.1; 188/272, 188/273, 290, 294, 295

(56) References Cited

U.S. PATENT DOCUMENTS

| | | | |
|---|---|---|---|
| 2,156,560 A | 5/1939 | Bachmann | |
| 2,880,825 A | 4/1959 | Porter | |
| 3,023,870 A | 3/1962 | Udelman | |
| 4,854,274 A | 8/1989 | Dingess | |
| 5,465,817 A | 11/1995 | Muscatell | |
| 5,482,261 A | * 1/1996 | Ortega | ........................ 267/168 |

* cited by examiner

Primary Examiner—Chris Schwartz
(74) Attorney, Agent, or Firm—Birch, Stewart, Kolasch & Birch, LLP

(57) ABSTRACT

A driveline brake assembly for use on trucks as either a primary braking system or a secondary braking system. A camshaft connected to the driveline carries a number of cams thereon. Each cam has associated therewith a pair of pressure glides which ride on the cam from opposite sides. Each pressure glide may be forced against the cam forcibly due to an inflated air bladder pressing compression springs against the back of the pressure glide. This forcible pushing of the glides against the cams causes the camshaft to slow its rotational speed and accordingly slow the truck.

16 Claims, 4 Drawing Sheets

DRIVESHAFT BRAKE ASSEMBLY

This application claims priority on provisional Application No. 60/396,002 filed on Jul. 16, 2002, the entire contents of which are hereby incorporated by reference.

BACKGROUND OF THE INVENTION

1. Field of the Invention

The present invention relates generally to a brake for a motorized vehicle and more particularly to an airbrake which applies braking pressure to the driveline of a truck.

2. Discussion of the Background

Various kinds of automobiles use different types of braking systems in order to slow and stop the motor vehicle when desired. The most common type of brake utilizes an abrasive material in the form of a rotor and disc or shoe and drum whereby two parts of the brake are forced into engagement with the friction resulting between the abrasive surface and the other surface being used to slow the vehicle. The force which causes the two parts to come together may either be directly applied through a mechanical system or applied by way of a hydraulic system. Many trucks also used a compressed air system to add additional force to the braking engagement.

While many of these systems operate safely, there are often problems especially in larger vehicles, such as trucks, in terms of the braking distance necessary in order to stop the vehicle when fully loaded. In addition, when brakes are applied too quickly, it is possible for the truck to jackknife or skid. This is an especially dangerous situation when the truck is going downhill.

Other forms of braking are also known, such as electrical braking where the interaction of two electrical fields causes the driveline to be slowed. Also known are arrangements where a spring-mounted piston is pressed against by a cam arrangement on a shaft. One example of this type of arrangement is U.S. Pat. No. 2,880,825 which describes a brake having a piston exerting a frictional retarding force upon a cam. In particular, this arrangement includes a plurality of fluid pressed pistons arranged radially around a cam mounted on the shaft to be braked.

Other brakes are also known which utilize some form of cam arrangement in the application of the braking force. For example, U.S. Pat. No. 5,697,678 includes piston 16 and 17 driven by an eccentric shaft 15. U.S. Pat. No. 5,465,817 shows a hydraulic brake pump using an eccentric cam arrangement with pistons. Cams 34 mounted on shaft 36 drive pistons 46 within cylinders. U.S. Pat. No. 3,023,870 shows an auxiliary brake whereby the camshaft is movable by the depression of the brake pedal so that the pistons remain in the compression stroke and act as a braking device. U.S. Pat. No. 2,156,560 shows a similar compression brake system.

However, in all of these systems, optimal braking force is difficult to achieve and additional help in braking is always desirable in a fully loaded downhill situation.

SUMMARY OF THE INVENTION

Accordingly, the present invention provides an improved braking system using a pressure box for applying force to glides which ride on a camshaft.

The present invention further provides a braking system for trucks utilizing a cam braking arrangement with an air bladder for applying force against a camshaft connected to a driveline.

The present invention still further provides a secondary braking system for a motor vehicle utilizing standard air pressure for applying a force to a camshaft.

This invention still further provides a primary braking system for a motor vehicle having an air bladder system for applying force through a compression spring to pressure glides which ride on cams mounted on a cam shaft in the drive line.

Briefly, these and other objects of the invention are achieved by providing a braking system having a camshaft with a number of cams mounted thereon in the driveline of the truck or other motor vehicle. Pressure glides ride on the camshafts and are pressed against the cams by way of compression springs which are forced outwardly by a bladder connected to a source of air pressure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
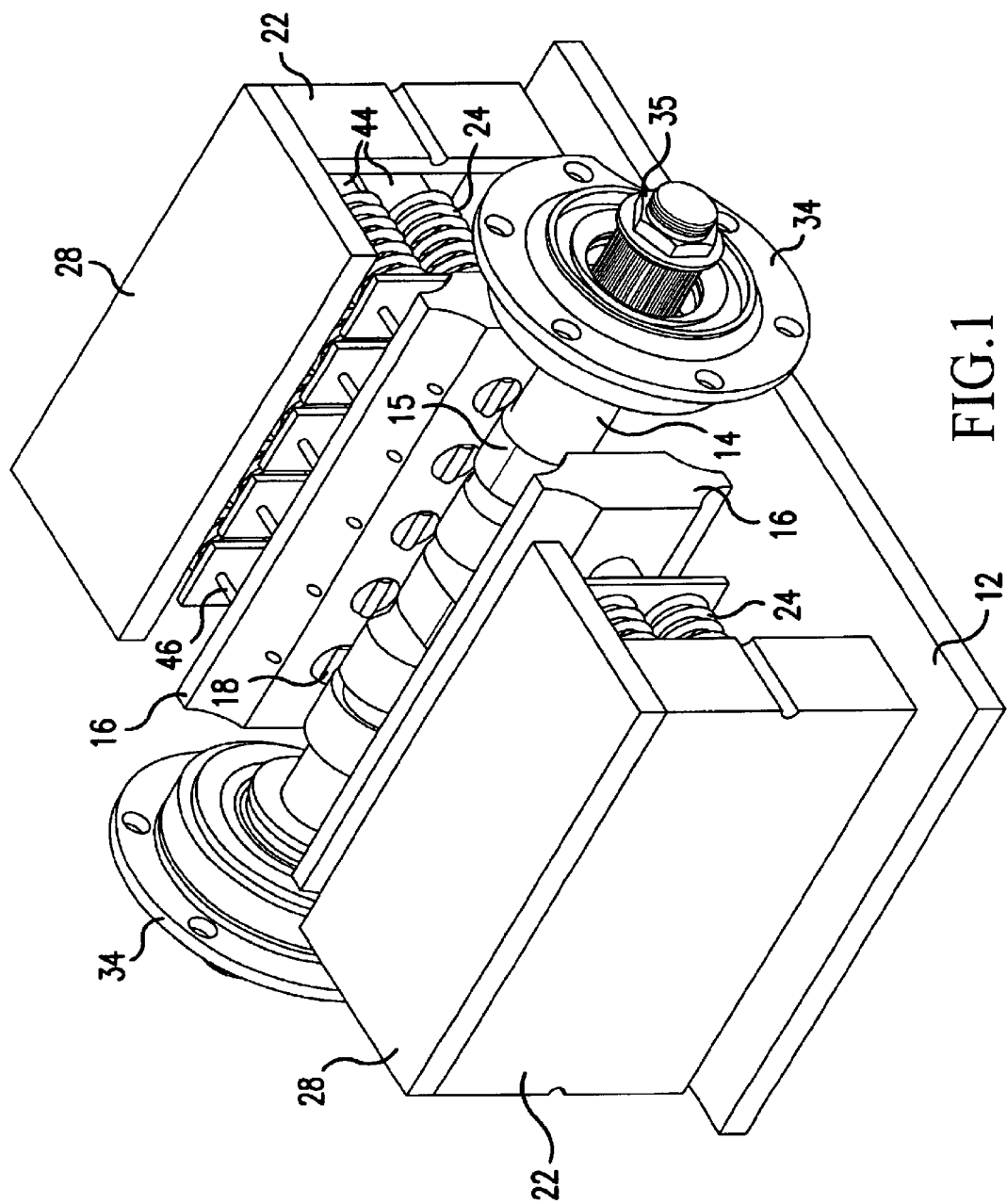
FIG. 1 is a perspective view of the brake assembly of the present invention.

Referring now to the drawings, wherein like reference numerals designate identical or corresponding parts throughout the several views and more particularly to FIG. 1 thereof, wherein the brake assembly is shown in perspective view. This assembly is also shown in exploded form in FIG. 2.

The assembly includes a main casing 10 (not shown in FIG. 1) into which the mechanism is placed. A bottom 12 is attached to the casing 10. A top (not shown) can be placed on top of the casing opposite the bottom 12 in order to have a complete housing for retaining the assembly and preventing damage thereto. A camshaft 14 which carries a number of cams 15 is placed between two holes in the casing wall. One hole is large enough to receive the entire camshaft while the other hole receives only the end of the shaft. A keeper plate 30 is placed over the end of the shaft which extends through the large hole in order to keep that end of the shaft securely in place. Each end of the shaft is held in place and allowed to rotate using a bearing backplate 31, O ring 32, bearing 33, bearing cover 35 and a nut 35. The nut acts to keep all of these pieces in place and is screwed on the end of the camshaft. While the number of cams shown in the camshaft are five, any number of cams can be utilized. More braking force is possible when larger numbers of cams are utilized.

On either side of the camshaft, an arrangement of glides are placed which contact the individual cams. This includes a glide keeper 16 which acts as a support mechanism for holding the glides. The pressure glides 18 are equal in number on each side to the number of cams on the shaft. A front end 19 of each pressure glide extends through a corresponding hole in the glide keeper and comes into contact with the corresponding cam. A brass bushing 20 is placed within the hole of the glide keeper in order to support the pressure glide as it extends therethrough. The pressure glides are arranged in a line on each side of the camshaft, but are allowed to move independently to follow the profile of the cam. Each pressure glide also contains a cam pin retainer 46 which also extends through a small hole in the glide keeper 16. The cam pin retainer helps to maintain the position of the pressure glide. In addition, a disengagement spring may be mounted thereon to help push the glide away from the cam when the brake is disengaged.

Figure 2:
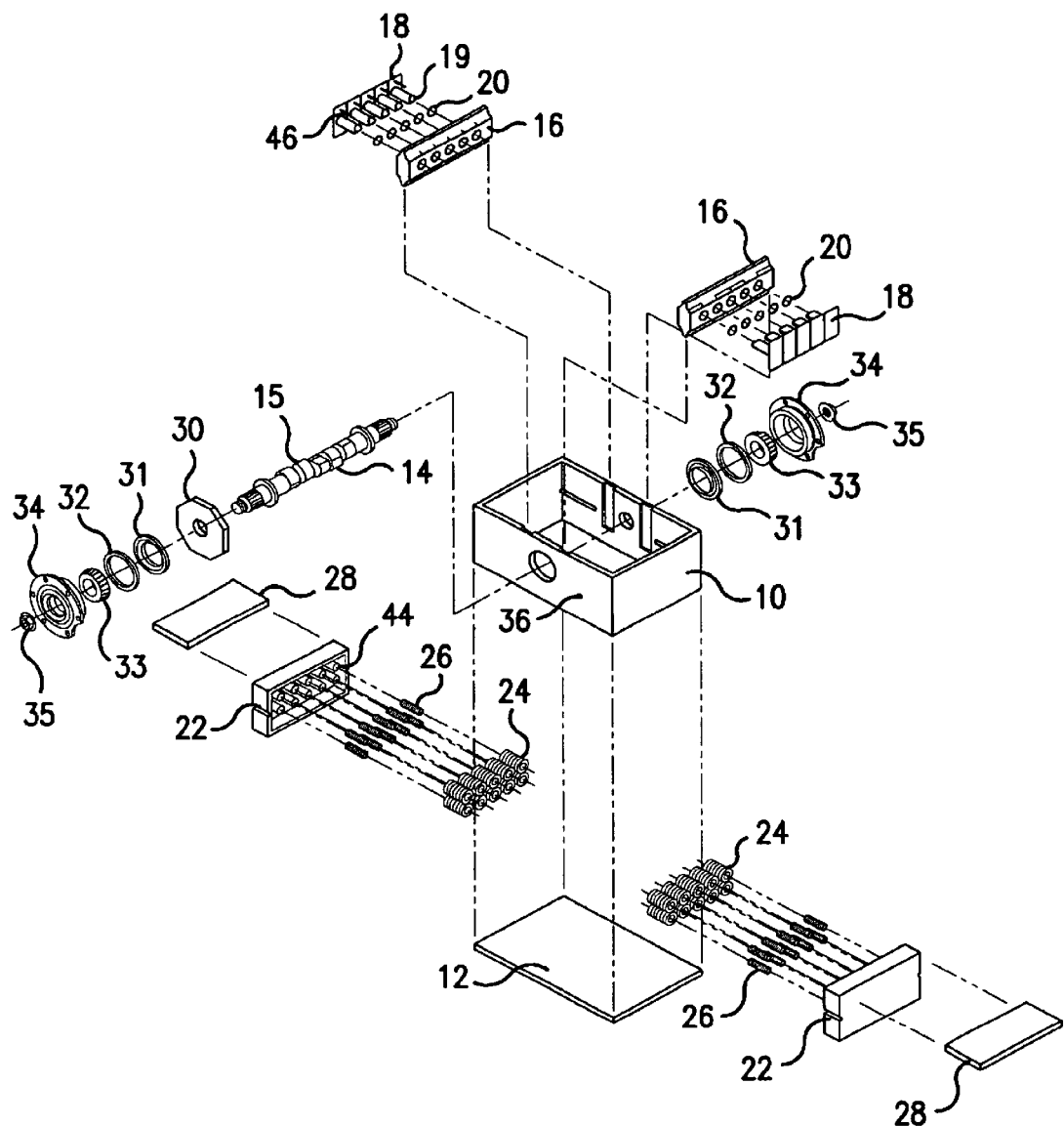
FIG. 2 is an exploded view of the brake assembly shown in FIG. 1.

As can be seen in FIGS. 1 and 2, the forward end 19 of the pressure glide which comes into contact with a cam has a forwardly projecting center section forming a bar extending parallel to the shaft. The area on either side of the raised bar slopes away so that the bar section comes into contact with the cam and can ride thereon without contacting the surrounding portion of the glide. This bar may be rounded in order to slide freely around the profile of the cam. However, other shapes are possible as long as the glide easily follows the cam profile.

Figure 5:
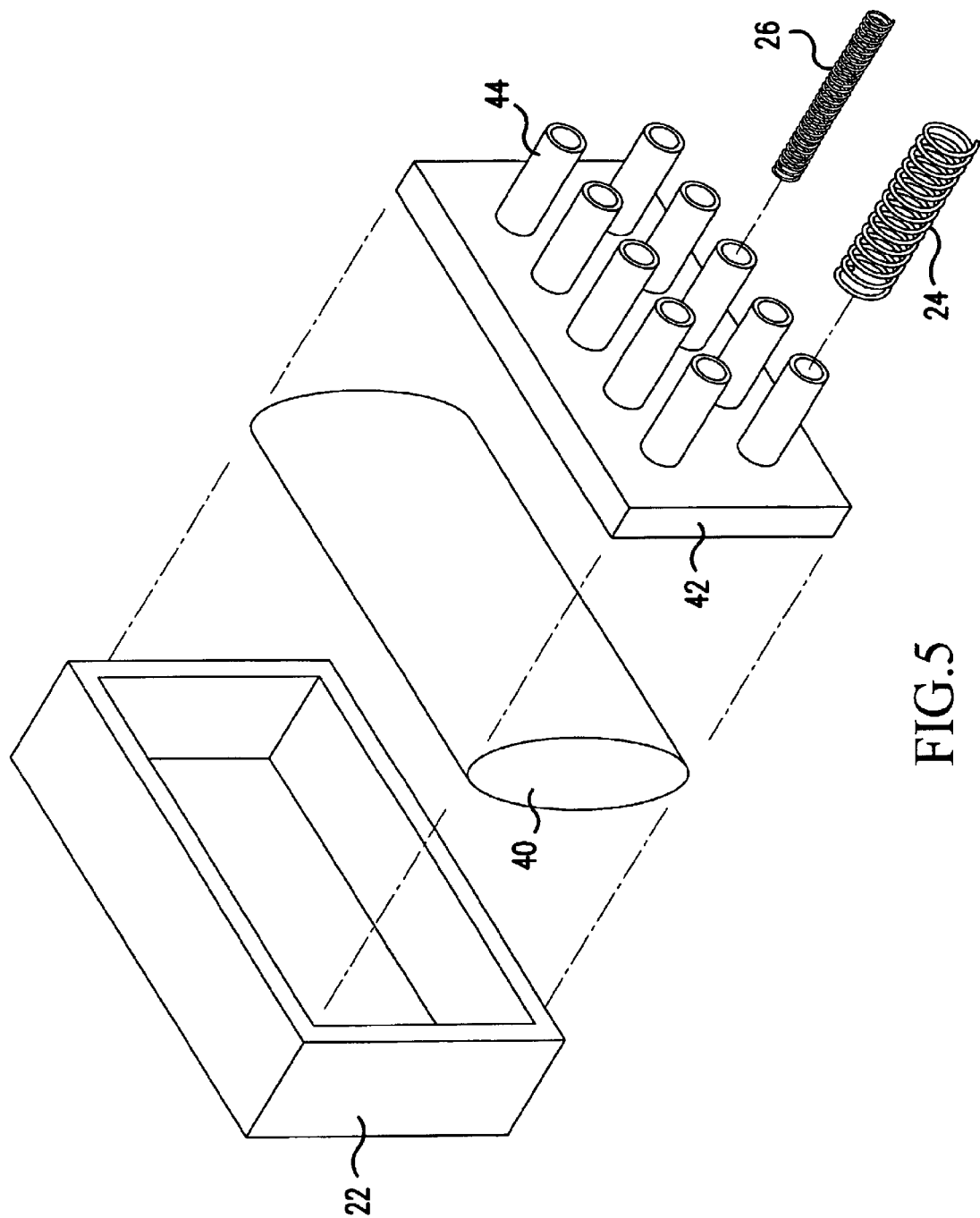
FIG. 5 is an exploded view of a portion of the brake assembly shown in FIG. 1.

Behind each arrangement of glides is an actuating mechanism for causing the glides to forcibly push against the cam. This arrangement is shown in FIG. 5 and includes a pressure box 22 which contains bladder 40 which is made of rubber and inflates under air pressure to apply force in the direction of the camshaft. A pressure plate 42 is also received inside the pressure box so that the bladder is contained between the back of the box and the pressure plate. The pressure plate includes on its front surface a series of spring retainer pins 44 which extend toward the camshaft. Each retainer pin has associated therewith an outer compression spring 24 and an inner compression spring 26. As seen in FIG. 5, the outer compression spring has a larger diameter and extends around the retainer pin so as to come in contact with the front face of the pressure plate 42. The inner compression springs 26 have a smaller diameter and are mounted within the outer springs and are coaxial therewith. The retainer pins may be hollow to receive the end of the inner springs to hold them in position. Alternatively, the pins may be only partially hollowed, or may have a solid end face to contact the end of the inner spring. Each pressure glide has associated therewith two outer compression springs and two inner compression springs. However, the number of spring pairs per glide is not critical and any number can be used, including one. The bladder cover 28 rests on top of the pressure box 22 and extends over the compression spring arrangement and the backside of the pressure glides. The inner and outer compression springs ride against the back of the pressure glides 18. While these are shown to have flat faces, the glides may also include a retainer for each pair of springs in the form of a tube into which the outer spring is received. A pin may also be placed within this tube around which the inner spring may extend to hold it in position as well.

The bladder 40 may be inflated by way of an air stem (not shown) which is connected to a source of compressed air. As it inflates, it pushes against the pressure plate 42 causing it to move in the direction of the camshaft. The bladder also pushes against the back of pressure box 22, which is fixed. This pressure causes the pressure plate to move forwardly and is guided by the sides of the pressure box. This movement causes the springs to also be pushed in the direction of the camshaft. The springs apply pressure against the back of the pressure glides. The front end 19 of each pressure glide is then forceably pushed against the cam associated therewith.

If the driver does not apply pressure to the brake pedal, the bladders are not connected to a source of compressed air and therefore do not press the compression springs against the pressure glides. When the brake pedal is actuated, compressed air causes the bladder to inflate and moves the springs in the direction of the camshaft. The inner compression springs are longer but not as powerful as the outer compression springs. The inner compression springs engage the pressure glides first with a relatively small amount of force. This holds the glides against the cams to prevent any loose play or "slopping" therebetween during the braking process. However, this is not enough force to cause actual braking.

At the same time, the movement of the pressure plate also forces the outer compression springs toward the camshaft. The outer compression springs push against the back of the pressure glides which are forced against the profiles of the cams mounted on the camshaft. As the camshaft turns, the lobe of each cam must push against the front of its associated pressure glide in order to move with the camshaft. As this cam pushes against the pressure glide, the pressure glide is forced backwardly against the pressure of the compression spring and bladder. A small amount of compression of the spring requires a large force to be applied to overcome the air pressure within the bladder. The application of this force causes the camshaft to slow down and the kinetic energy of the moving truck to be absorbed.

Each of the pressure glides comes in contact with the lobe of its associated cam in turn. As noted in FIG. 4, the lobes of the cams are spaced equiangularly around the shaft. Accordingly, the pressure glides consecutively remove energy from the camshaft. Because each of the cams have a long incline to the lobe, the braking action caused by each lobe continues for a relatively long time. As seen in the figure, the cams overlap so that more than one pressure glide is actuated at a time. As a result, the application of force is smoother and greater force can be applied at any given time. Each cam wilt come into contact with one pressure glide on each side as it rotates 360. If desired, additional sets of pressure glides could be added to the assembly so that more than two sets are present. Likewise, it would be possible to utilize a single set although two sets are preferable due to the balancing of the forces.

The camshaft is connected to the driveline of the vehicle. It can replace a section of the driveshaft or other part of the driveline in a retrofit arrangement, or it can be manufactured as part of the driveline during assembly. When the vehicle moves, the shaft rotates along with other parts of the driveline. When force is applied in this manner to the camshaft, its rotational speed is slowed. Since the camshaft is part of the driveline or integrally connected thereto, the complete driveline is then also slowed.

This assembly can be used as a secondary braking system to give additional braking force beyond that supplied with standard air brakes. However, if desired and if powerful enough, this system can replace convention primary braking systems. When used as a secondary braking system, it reduces maintenance cost on the primary system since it requires that the primary system is not relied on as heavily. The system could be used as an emergency brake if desired, when the primary system fails.

This system is designed to handle the problem of heavily loaded trucks which can easily overheat brake drums, which causes the loss of braking ability. Such a situation is often the cause of brake failure and resultant accidents of large trucks. The present apparatus does not utilize friction and does not overheat in operation. Thus, even when a heavily loaded truck is traveling downhill, it is possible to use such a system without danger of overheating and brake failure. This also allows trucks to stop at a much shorter distance without problems of jackknifing or skidding.

The present system is designed to operate on compressed air at an air pressure commonly utilized by trucks. Thus, no special compressor is necessary in order for the brake to operate. The system may be operated by air pressure at 100 lbs per square inch so that up to 28,000 lbs of stopping power may be achieved. This can even be improved further by utilizing a higher air pressure or additional cams and glides.

Preferably, the entire system is in an oil bath which keeps it cool and noise free. The oil may be added by way of a fill hole 36 in the side of casing 10. It is also possible to have rollers added to each of the pressure glides so that they may more easily move back and forth within the glide keeper.

Figure 3:
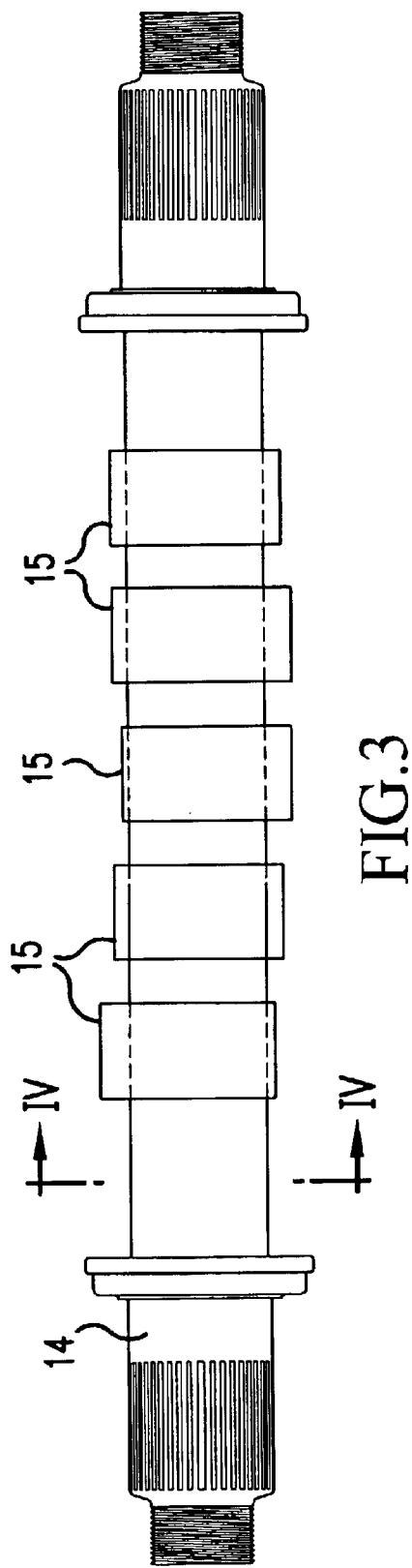
FIG. 3 is a side view of the cam shaft used in the brake assembly of FIG. 1.

FIG. 3 shows more detail of the camshaft 14, including the five cams 15. While the overall size of the camshaft can vary according to application, a typical example would be 27 inches from end to end. This would include a 16-inch center section on which the cams are mounted. As an example, the cams can be ¾ of an inch apart, with each cam being 1.4 inches wide. These dimensions are purely exemplary and any size may be utilized as required by the situation.

Figure 4:
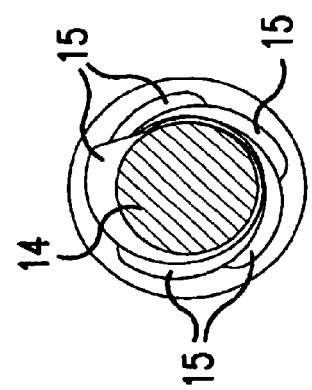
FIG. 4 is a cross-sectional view of the camshaft of FIG. 3, taken along line IV—IV.

FIG. 4 shows a cross-sectional view of the camshaft and cam along lines IV—IV. As can be seen, the shaft has mounted thereon five cams which are mounted equiangular around the periphery of the shaft. The profiles of the cams can be easily seen also.

This braking device has been described as it would be used on a motor vehicle, and especially on a large vehicle such as a truck. However, it can be used on any type of vehicle and in fact could also be used on a stationary piece of equipment having a rotating shaft which needs to be slowed.

Numerous additional modifications and variations of the present invention are possible in light of the above teachings. It is therefore to be understood that within the scope of the appended claims, the invention may be practiced otherwise than is specifically described herein.

What is claimed is:

1. A brake assembly for braking a vehicle comprising:
    a shaft connected to the wheels of the vehicle;
    at least one cam mounted on said shaft;
    at least one pressure glide corresponding to each of said at least one cam and arranged for contact therewith;
    an inflatable bladder, which upon inflation applies pressure to said pressure glide, forcing it into engagement with a corresponding cam;
    wherein each of said at least one pressure glide is pushed backwardly by said corresponding can as it turns, causing said cam and said shaft to be slowed rotationally, thus braking said vehicle.

2. The assembly according to claim 1, further comprising at least one first compression spring corresponding to each of said at least one pressure glide, mounted between said bladder section and said pressure glide for transmitting force between said bladder section and said pressure glide.

3. The assembly according to claim 2, further comprising at least one second compression spring corresponding to each of said at least one pressure glide, mounted within said first compression springs for maintaining pressure against said pressure glide to contact a corresponding cam.

4. The assembly according to claim 3, wherein said second compression springs are longer than said first compression springs.

5. The assembly according to claim 1, wherein said shaft is connected to a driveline of the motor vehicle.

6. The assembly according to claim 5, wherein the vehicle is a truck.

7. The assembly according to claim 5, wherein said bladder is inflated when an operator of said vehicle applies pressure to a brake pedal, causing said bladder to expand, and shaft to slow rotationally and, accordingly, to slow said vehicle.

8. The assembly according to claim 5, wherein said bladder sections are inflated using compressed air available on said vehicle.

9. The assembly according to claim 1, further comprising glide keepers for supporting said pressure glides.

10. The assembly according to claim 1, wherein said shaft carries a plurality of cams with at least two pressure glides for each cam, arranged on opposite sides of said shaft.

11. The assembly according to claim 1, wherein said brake assembly is a primary brake on a vehicle.

12. The brake assembly according to claim 1, wherein said brake assembly is a secondary brake arrangement on a vehicle.

13. The assembly according to claim 1, wherein said shaft carries a plurality of cams and wherein the cams overlap in cross section so that a plurality of corresponding pressure glides are pushed backwardly at the same time causing braking to be applied continuously and evenly.

14. A method of braking a vehicle, comprising:
    providing at least one cam on a shaft arranged in the driveline of said vehicle;
    inflating a bladder using compressed air in response to actuation of a brake pedal;
    forcing a pressure glide into engagement with each of said at least one cam by means of said inflating bladder;
    wherein movement of said cam against said pressure glide acts to slow said cam, slow said shaft and brake said vehicle.

15. The method according to claim 14, further comprising:
    providing compression springs between said bladder and said pressure glide.

16. The method according to claim 14, a plurality of cams are provided and wherein the cams overlap in cross section so that a plurality of pressure glides are forced into engagement at the same time causing such shaft to be slowed and said vehicle braked evenly and continuously.

* * * * *